US010558266B2

(12) United States Patent
Longo et al.

(10) Patent No.: US 10,558,266 B2
(45) Date of Patent: Feb. 11, 2020

(54) SHAPE MEMORY ALLOY ACTUATED HAPTIC FEEDBACK

(71) Applicant: Microsoft Technology Licensing, LLC, Redmond, WA (US)

(72) Inventors: Thomas J. Longo, Redmond, WA (US); Scott D. Bowers, Woodinville, WA (US); Yazan Aldehayyat, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 15/639,683

(22) Filed: Jun. 30, 2017

(65) Prior Publication Data

US 2019/0004603 A1 Jan. 3, 2019

(51) Int. Cl.
*G06F 3/01* (2006.01)
*G06F 3/0354* (2013.01)
*G06F 3/02* (2006.01)

(52) U.S. Cl.
CPC ............ *G06F 3/016* (2013.01); *G06F 3/0202* (2013.01); *G06F 3/03547* (2013.01)

(58) Field of Classification Search
None
See application file for complete search history.

(56) References Cited

U.S. PATENT DOCUMENTS

| 7,464,548 | B2 | 12/2008 | Yson et al. |
| 7,821,493 | B2 | 10/2010 | Tierling et al. |
| 8,378,979 | B2 | 2/2013 | Frid et al. |
| 9,063,625 | B2* | 6/2015 | Hiroyuki ................. G06F 3/044 |
| 9,208,662 | B2* | 12/2015 | Wang ....................... G06F 3/016 |
| 10,191,550 | B1* | 1/2019 | Nussbaum .............. G06F 3/016 |
| 2010/0231508 | A1 | 9/2010 | Cruz-hernandez et al. |
| 2011/0102162 | A1 | 5/2011 | Gregorio et al. |
| 2013/0154984 | A1* | 6/2013 | Gondo .................... G06F 3/016 345/173 |

(Continued)

FOREIGN PATENT DOCUMENTS

CN 103064509 A 4/2013

OTHER PUBLICATIONS

Kabla, et al., "A novel shape memory alloy micro actuator for large in-plane strokes and forces", In Proceedings of Smart Materials and Structures, vol. 25, Issue 7, Jun. 1, 2016, pp. 1-8.

*Primary Examiner* — Kenneth B Lee, Jr.
(74) *Attorney, Agent, or Firm* — Arent Fox LLP (57) ABSTRACT

Aspects described herein generally relate to a haptic feedback mechanism including a shape memory alloy (SMA) material coupled to a mass and a surface, where contraction of the SMA material causes the mass to move from a first position to a second position causing one of compression or decompression of a spring element coupled to the mass, and where loosening of the SMA material causes the mass the move from the second position toward the first position by the other one of compression or decompression of the spring element. The haptic feedback mechanism also includes a heat source configured to selectively apply heat to, and remove heat from, the SMA material to achieve a modulation of contracting and loosening of the SMA material to cause a vibration of the mass.

20 Claims, 4 Drawing Sheets

(56) References Cited

U.S. PATENT DOCUMENTS

| | | | |
|---|---|---|---|
| 2013/0222310 A1* | 8/2013 | Birnbaum | G06F 3/016 |
| | | | 345/173 |
| 2014/0125608 A1* | 5/2014 | Murata | G06F 3/0414 |
| | | | 345/173 |
| 2016/0259415 A1* | 9/2016 | Ullrich | G06F 3/016 |
| 2017/0052593 A1 | 2/2017 | Jiang et al. | |
| 2017/0061753 A1 | 3/2017 | Khoshkava et al. | |
| 2017/0284379 A1* | 10/2017 | Krumpelman | F03G 7/065 |
| 2017/0333788 A1* | 11/2017 | Grant | A63F 13/24 |
| 2017/0336869 A1* | 11/2017 | Khoshkava | A63F 13/24 |
| 2018/0188810 A1* | 7/2018 | Krumpelman | G06F 3/0338 |

* cited by examiner

Figure 4

SHAPE MEMORY ALLOY ACTUATED HAPTIC FEEDBACK

BACKGROUND

Use of computing devices is becoming more ubiquitous by the day. Computing devices range from standard desktop computers to wearable computing technology and beyond. Computing devices and/or corresponding peripherals often include haptic feedback mechanisms for providing touch sensations on the computing devices and/or peripherals as an indication of notifications, events, interaction with the computing devices and/or peripherals, etc. Many haptic feedback mechanisms employ linear resonant actuators (LRAs) to generate the haptic feedback. Such actuators typically employ a magnet and spring assembly to move a mass between first and second positions, where at least one of the positions is near a housing of the device. The movement can be modulated to achieve a vibration effect on the housing of the device for providing the haptic feedback. Typically, such LRAs can employ a voice coil to resonate the haptic feedback based on a magnetic field applied to the voice coil. In other examples, piezoelectric haptic feedback mechanisms can be used. In either case, however, these haptic feedback mechanisms may not be able to provide haptic feedback at lower frequencies (e.g., less than 1,000 Hertz (Hz)), and also may require more than a desirable amount of space for installation in a computing device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, an apparatus for providing haptic feedback is provided. The apparatus includes a mass, a spring element coupled to the mass and coupled to a surface, where the spring element supports the mass and allows for movement of the mass with respect to the surface, a shape memory alloy (SMA) material coupled to the mass and coupled to the surface, where contraction of the SMA material causes the mass to move from a first position to a second position causing one of compression or decompression of the spring element, and where loosening of the SMA material causes the mass the move from the second position toward the first position by the other one of compression or decompression of the spring element, and a heat source configured to selectively apply heat to, and remove heat from, the SMA material to achieve a modulation of contracting and loosening of the SMA material to cause a vibration of the mass.

In another example, a computing device is provided that includes a chassis, a display disposed within the chassis, at least one processor and a memory disposed within the chassis, and a haptic feedback mechanism. The haptic feedback mechanism includes a mass, a spring element coupled to the mass, where the spring element supports the mass and allows for movement of the mass within the chassis, a SMA material coupled to the mass, where contraction of the SMA material causes the mass to move from a first position to a second position causing one of compression or decompression of the spring element, and where loosening of the SMA material causes the mass the move from the second position toward the first position by the other one of compression or decompression of the spring element, and a heat source configured to selectively apply heat to, and remove heat from, the SMA material to achieve a modulation of contracting and loosening of the SMA material to cause a vibration of the mass.

In another example, a method for providing haptic feedback. The method includes detecting, by a processor, occurrence of an event for corresponding haptic feedback, determining, by the processor, a frequency and a period of time for providing the haptic feedback; actuating, by the processor, a heat source to apply heat to, or remove heat from, a SMA material to cause movement of a mass, coupled with the SMA material, at the frequency during the period of time to provide the haptic feedback.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various aspects related to a shape memory alloy (SMA) actuated haptic feedback mechanism. For example, the haptic feedback mechanism can include at least a mass that is coupled to both of a spring element and a SMA material. The mass, spring element, and SMA material can be configured such that when the SMA material is heated (e.g., heat is applied via a heat source, including supplying an electric current), the SMA materials deforms from a first shape to a second shape, which can cause the mass coupled to the SMA material to move from a first position to a second position in a direction that deforms the spring element. When the SMA material is cooled (e.g., heat via the heat source is removed, including reducing or removing the electric current), force from the deformed spring element can cause the mass to move from the second position toward the first position. Heating and cooling of the SMA material can be modulated to cause a vibrating effect of the mass, which can cause haptic feedback in a device where the mass is near a housing or chassis of a device when in or near the first or second position.

In a specific example, the mass, spring element, and SMA material can be configured to allow movement of the mass in substantially any direction (or one or more directions) respective to the device within which the components are housed. For example, the mass can move along a horizontal (e.g., X) axis, vertical (e.g., Y) axis, and/or a depth (e.g., Z) axis, etc., with respect to a surface of a device (e.g., a device housing or chassis), to provide haptic feedback in one or more directions. Using the SMA material can allow for achieving lower haptic feedback frequencies (e.g., less than 1000 Hertz (Hz), less than 100 Hz, etc.) and/or for achieving smaller form factors due to the ability to use smaller components to build the haptic feedback mechanism. For example, the mass can be substantially any size designed to provide a desired force, and the SMA material may be a wire, ribbon, plate, foil, etc., and may be sized to provide sufficient strength to support the weight of the mass in motion, and/or to support the force needed to deform the spring element. Moreover, a magnet may not be needed in this configuration, which can provide further cost and weight savings when compared to conventional haptic feedback mechanisms.

Figure 1:
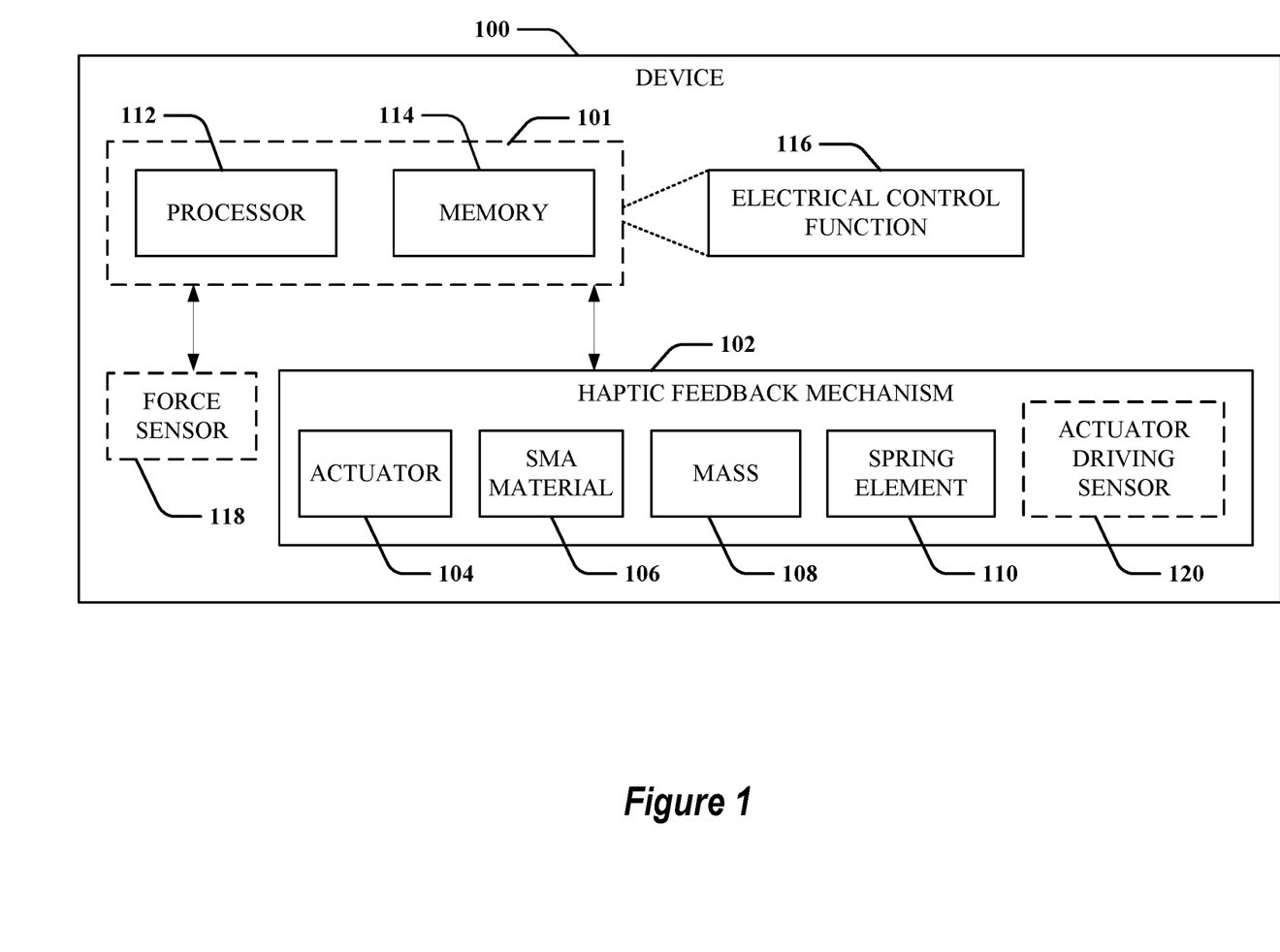
FIG. 1 illustrates a schematic diagram of an example of a device employing a haptic feedback mechanism in accordance with aspects described herein.
Figure 2:
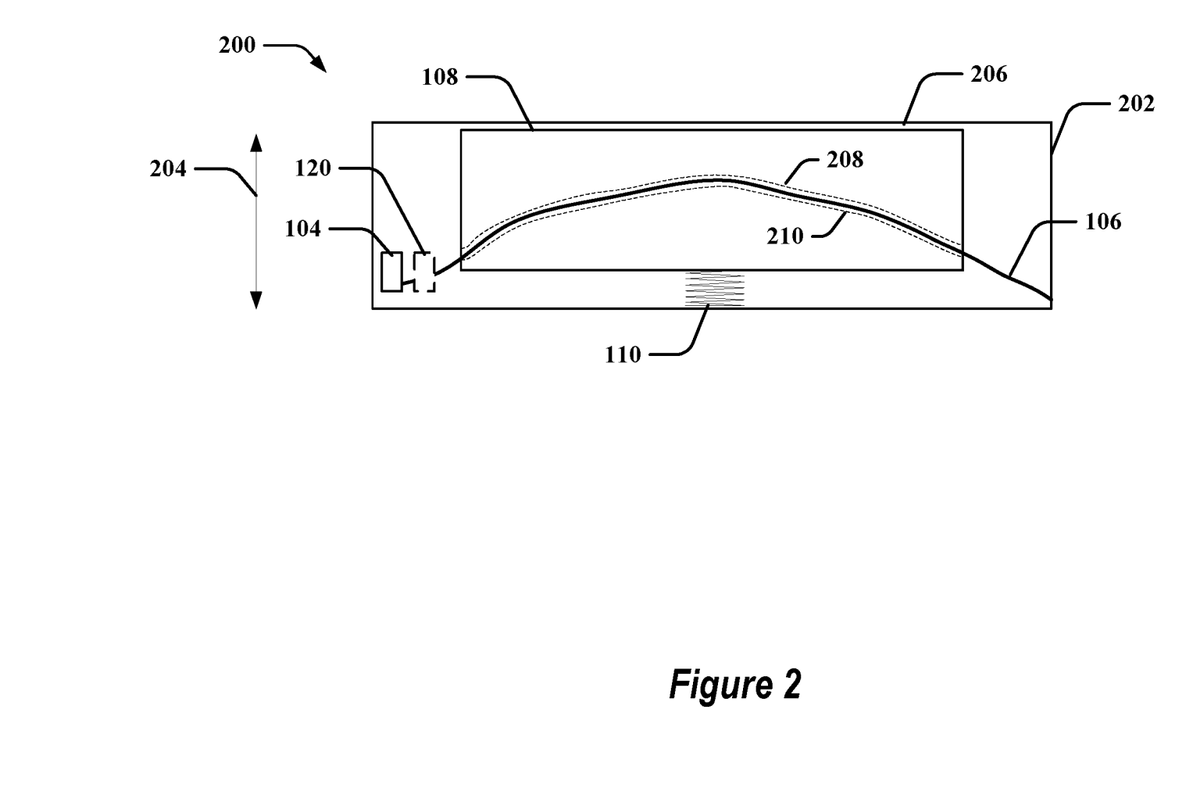
FIG. 2 illustrates a schematic front, rear, or side view of an example of a haptic feedback mechanism that provides haptic feedback along one axis of movement in accordance with aspects described herein.
Figure 3:
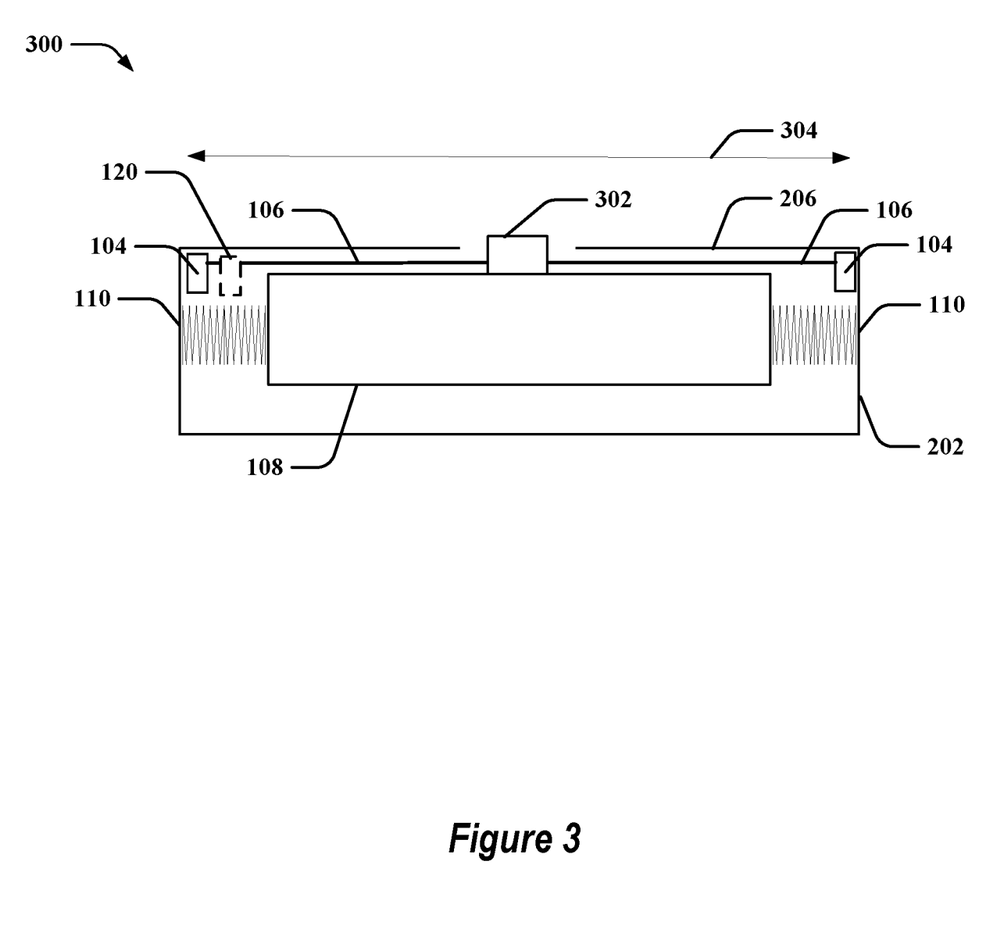
FIG. 3 illustrates a schematic front, rear, or side view of an example of a haptic feedback mechanism that provides haptic feedback along another axis of movement in accordance with aspects described herein.

Turning now to FIGS. 1-3, examples are depicted with reference to one or more components and one or more methods that may perform the actions or operations described herein, where components and/or actions/operations in dashed line may be optional. Although the operations described below in FIG. 3 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 in accordance with aspects described herein. For example, device 100 can include one or more haptic feedback mechanisms 102 for providing haptic feedback (e.g., based on detecting occurrence of one or more events on the device 100). Device 100 may be a computing device, such as a desktop computer, laptop computer, tablet computer, hybrid computer, smartphone or other personal device, a computing device peripheral, such as a keyboard, trackpad, mouse, pen, etc., which may provide haptic feedback for certain detected events, via the haptic feedback mechanism 102.

The haptic feedback mechanism 102 can include an actuator 104 for actuating a SMA material 106 (e.g., by applying heat to, or removing heat from, the SMA material 106), a mass 108 coupled to the SMA material 106 and also coupled to a spring element 110. For example, contraction of the SMA material 106 (e.g., when heat is applied) can cause the mass 108 to move from a first position to a second position, as described herein, and in a direction that causes the spring element 110 to deform. Loosening (e.g., expanding, relaxing, etc.) of the SMA material 106 (e.g., when heat is removed, cooling is applied, etc.) can cause the mass 108 to move from the second position towards the first position, as described herein, based on a force from the deformed spring element 110. For example, the mass 108 may contact a surface, such as a housing of the haptic feedback mechanism 102 and/or a chassis of the device 100 in the first position and/or the second position to provide a contact feel for the haptic feedback, and/or may resonate without necessarily contacting the surface. In addition, for example, the actuator 104 can be controlled to actuate the SMA material 106 by selectively applying/removing the heat source to achieve a modulation of contacting/loosening of the SMA material 106 to provide a vibration at a certain frequency for a period of time.

In an example, device 100 may include or may otherwise be coupled with a processor 112 and/or memory 114, where the processor 112 and/or memory 114 may be configured to execute or store instructions or other parameters related to executing an electrical control function 116 for the haptic feedback mechanism 102. For example, electrical control function 116 can be implemented to control the haptic feedback mechanism 102 based on a determined frequency and/or period of time, and can accordingly control the actuator 104 to achieve a modulation of the mass 108 that corresponds to the frequency during the period of time by contracting/loosening the SMA material 106. In some examples, as described further herein, the actuator 104 may include a circuit board (e.g., printed circuit board (PCB)), a wire coupled to a PCB, etc.), and the electrical control function 116 may control supplying an amount of electricity to the SMA material 106 via the PCB or wire, etc. For example, processor 112 and memory 114 may be separate components communicatively coupled by a bus (e.g., on a motherboard or other portion of a computing device, on an integrated circuit, such as a system on a chip (SoC), etc.), components integrated within one another (e.g., processor 112 can include the memory 114 as an on-board component 101), and/or the like. Memory 114 may store instructions, parameters, data structures, etc., for use/execution by processor 112 to perform functions described herein.

In addition, for example, haptic feedback mechanism 102 may include a separate processor and/or memory for actuating the actuator 104 based on input from processor 112 and/or memory 114 (and/or electrical control function 116), which can include a signal to activate the actuator 104, an indication of frequency and/or period of time at which to actuate the actuator 104, etc. In other examples, processor 112 and/or memory 114 may be coupled to the haptic feedback mechanism 102 to directly control actuator 104. Moreover, as described, processor 112 and/or memory 114 may be coupled to multiple haptic feedback mechanisms 102 and may accordingly control the multiple haptic feedback mechanisms 102 to provide different haptic feedback for various detected events.

Furthermore, in an example, device 100 may include a force sensor 118 to detect a force applied to a component, surface, etc., related to the device 100. Where the force sensor 118 detects that a force applied achieves a force threshold, force sensor 118 can indicate the event to processor 112 and/or memory 114, which can provide feedback that enables haptic feedback mechanism 102 to provide haptic feedback based on indicated parameters (e.g., at a frequency for a period of time). In one example, the device 100 may include multiple force sensors 118, which may each correspond to one or more haptic feedback mechanisms 102.

In an example, haptic feedback mechanism 102 may optionally include an actuator driving sensor 120, which can be configured to determine one or more parameters for operating the actuator 104. For example, actuator driving sensor 120 can analyze one or more properties of the SMA material 106 and/or properties corresponding to actuation thereof, such to determine the one or more parameters for actuating the SMA material 106. For example, actuator driving sensor 120 may include a capacitive sensor for determining a current passed through the SMA material 106, a force sensor to detect a contraction force of the SMA material 106, a temperature sensor to detect a temperature of the SMA material 106, etc. Based on such properties, the actuator driving sensor 120 can determine a position of the SMA material 106 and/or, correspondingly, the mass 108, and can accordingly adjust one or more parameters of the actuator 104 (e.g., a current passed through the SMA material 106) to adjust actuation of the SMA material 106. For example, actuator driving sensor 120 may analyze the one or more properties of the SMA material 106 or corresponding actuation thereof, and can utilize the one or more properties as feedback for adjusting the actuation parameters, such to correct actuation of the SMA material 106 based on one or more specifications for the properties.

FIG. 2 is a schematic front, rear, or side view of an example of a haptic feedback mechanism 200 that provides haptic feedback in an axis of movement 204 in accordance with aspects described herein. For example, haptic feedback mechanism 200 may be or may include haptic feedback mechanism 102, as described in reference to FIG. 1. Haptic feedback mechanism 200 accordingly includes an actuator 104 connected to SMA material 106, which is in sliding contact with mass 108, which is in contact with spring element 110. Haptic feedback mechanism 200 can also include a housing 202, which may be a housing or chassis of a device (such as a computing device), a housing of the haptic feedback mechanism, or another surface of a housing, chassis, etc. of the computing device or haptic feedback mechanism 200. For example, housing 202 includes a top surface 206, which may be or include a thin wall at least where the mass 108 can contact the top surface 206 when moving between first and second positions to provide haptic feedback. In one example, the mass 108 can be attached to the top surface 206, such that movement of the mass 108 may cause movement of the top surface 206.

In this example, actuator 104, which may be a heat source, may apply heat to the SMA material 106, which may be an SMA wire, SMA plate, SMA foil, and/or substantially any shape that can tighten or shrink when heat is applied such to apply force for moving a coupled mass 108. When actuator 104 applies the heat, SMA material 106, which can be physically attached to the housing 202 and/or actuator 104, can shrink and pull the mass 108 from a first position to a second position, e.g., in a direction along axis of movement 204 that moves the mass 108 toward spring element 110. For example, actuator 104 can apply heat to the SMA material 106 by passing electrical current (e.g., at a certain voltage, amperage, etc.) through the SMA material 106, where the electrical current is sufficient to heat the SMA material 106, and/or actuator 104 may cool the SMA material 106 by terminating the current being passed through the SMA material 106. Spring element 110 can compress, in this example, to apply an opposing force to the mass 108. Accordingly, when the SMA material 106 is cooled (e.g., when the heat source is removed), the SMA material 106 can expand causing the force from the spring element 110 to move the mass 108 towards the first position in a direction along the axis of movement 204 that moves the mass 108 away from the spring element 110, and may cause contact of the mass 108 with top surface 206 of the housing 202. In this implementation, the deformation of the SMA material 106 may be in a direction or plane substantially perpendicular to the axis of motion of the mass 108. As described, for example, actuator 104 can continually and/or selectively apply the heat source to cause a vibration effect for the mass 108, where mass 108 contacting housing 202 during the vibration can cause a haptic feedback on the housing 202 that can be felt by a user touching the housing 202.

For example, the axis of movement 204 can be relative to a device within which the haptic feedback mechanism 200 is installed (e.g., a Z-axis along a depth of a device, where the depth may correspond to one dimension of a plane of a surface of the device on which interaction with a user is to occur). For example, the axis of movement 204 may be substantially perpendicular to a display surface of a device, a top of a key on a keyboard or trackpad, etc. In any case, where actuator 104 continually cycles heat to/from the SMA at a frequency equal to a resonance frequency of the mass 108 and/or spring element 110 system, the mass 108 can vibrate to provide a haptic feedback effect.

In an example, mass 108 may be composed of a material that can provide a heatsink effect for the SMA material 106, such as a metal material having a relatively high thermal constant (e.g., steel, aluminum, beryllium, copper, etc.), as compared to other metal materials. In another example, mass 108 may form an extension structure effective for providing heatsink properties (e.g., a flat surface with parallel or cross-hatched grooves to facilitate heat dissipation, fins, extension members, a structure having a high surface area to thickness ratio, etc.). In other examples, mass 108 may include a cooling or refrigerant component to assist in cooling the SMA material 106. Additionally, mass 108 may include one or more walls 208, 210 that define a channel on a surface of or through the body of the mass within which the SMA material 106 can be disposed. The one or more walls 208, 210 or channel have a surface finish that may allow sliding movement of the SMA material 106, preferably with low static and dynamic friction.

Actuator 104 can include a circuit board (e.g., PCB), a wire coupled to a PCB, etc., that may be coupled to the SMA material 106 to apply heat thereto (e.g., by applying an electric current that results in resistive heating). SMA material 106 may be otherwise electrically isolated from housing 202 of the haptic feedback mechanism 200 and/or a surface or chassis of a related device to avoid providing an electronic charge thereto when actuator 104 is actuated. Additionally, actuator 104 can include an input (e.g., via a port that can couple to a bus of a device, etc.) for allowing control of the actuator (e.g., via an electrical control function 116, corresponding processor 112, etc.), as described. In addition, for example, actuator driving sensor 120 can be positioned on or near the SMA material 106 to detect the one or more properties thereof, as described.

FIG. 3 is a schematic front, rear, or side view of an example of a haptic feedback mechanism 300 that provides haptic feedback in an axis of movement 304 in accordance with aspects described herein. For example, haptic feedback mechanism 300 may be or may include haptic feedback mechanism 102, as described in reference to FIG. 1. Haptic feedback mechanism 300 accordingly includes one or more actuators 104 connected to one or more SMA materials 106, which are in contact with mass 108, which is in contact with one or more spring elements 110. SMA material(s) 106 can be attached to a coupling member 302 of the mass 108 to facilitate moving the mass 108 when the SMA material(s) 106 contract and/or loosen (via one or more of the spring elements 110). In an example, actuator(s) 104 can be actuated out of phase to allow the two SMA wires 106 to be driven out of phase, which can allow the mass 108 to vibrate (e.g., symmetrically or asymmetrically, where the actuators 104 apply different temperatures of heat and/or for different durations of time). Haptic feedback mechanism 300 can also include a housing 202, which may be a housing of a device (such as a computing device), a housing of the haptic feedback mechanism, or a surface of a housing or chassis. For example, housing 202 may include a top surface 206, as described, which may be a thin wall at least where the mass 108 and/or the coupling member 302 can contact the housing 202 when moving between first and second positions to provide haptic feedback.

In this example, actuator(s) 104, which may be a heat source, may apply heat to the SMA material(s) 106, which may include an SMA wire, SMA plate, SMA foil, and/or substantially any shape that can tighten or shrink when heat is applied such to apply force for moving a coupled mass 108. When actuator(s) 104 applies the heat, SMA material(s) 106, which can be physically attached to the housing 202, or a related surface, and/or actuator 104, can shrink and pull the mass 108, from a first position to a second position, in a first direction along the axis of movement 304 (e.g., toward an edge of the housing 202), which can cause the mass 108 to compress against one spring element 110 and/or pull from another spring element 110, both of which can apply an opposing force to the mass 108. Accordingly, when the SMA material(s) 106 are cooled (e.g., when the heat source is removed), the SMA material 106 can expand causing the force from the spring elements 110 to move the mass 108 towards a second position in a second direction (opposite the first direction) along the axis of movement 304. In either movement, for example, mass 108 and/or coupling member 302 can contact at least a portion of the housing 202, and/or coupling member 302 can transfer vibration from mass 108 to the surface of housing 202. In this implementation, the deformation of the SMA material 106 may be in a direction or plane substantially parallel to the axis of motion of the mass 108.

As described, for example, actuator(s) 104 can continually and/or selectively apply the heat source to cause a vibration effect for the mass 108, where mass 108 and/or coupling member 302 contacting housing 202 during the vibration can cause a haptic feedback feel on the housing 202. In an example, actuator(s) 104 can be actuated out of phase to allow the two SMA wires 106 to be driven out of phase, which can allow the mass 108 to vibrate (e.g., symmetrically or asymmetrically, where the actuators 104 apply different temperatures of heat and/or for different durations of time).

For example, the axis of movement 304 can be relative to a device within which the haptic feedback mechanism 200 is installed (e.g., a X/Y-axis along a perimeter of a device, where the perimeter may correspond to a surface of the device on which interaction with a user is to occur). For example, the axis of movement 304 may include a horizontal/vertical direction along a display surface of a device, a top of a key on a keyboard or trackpad, etc.

Figure 4:
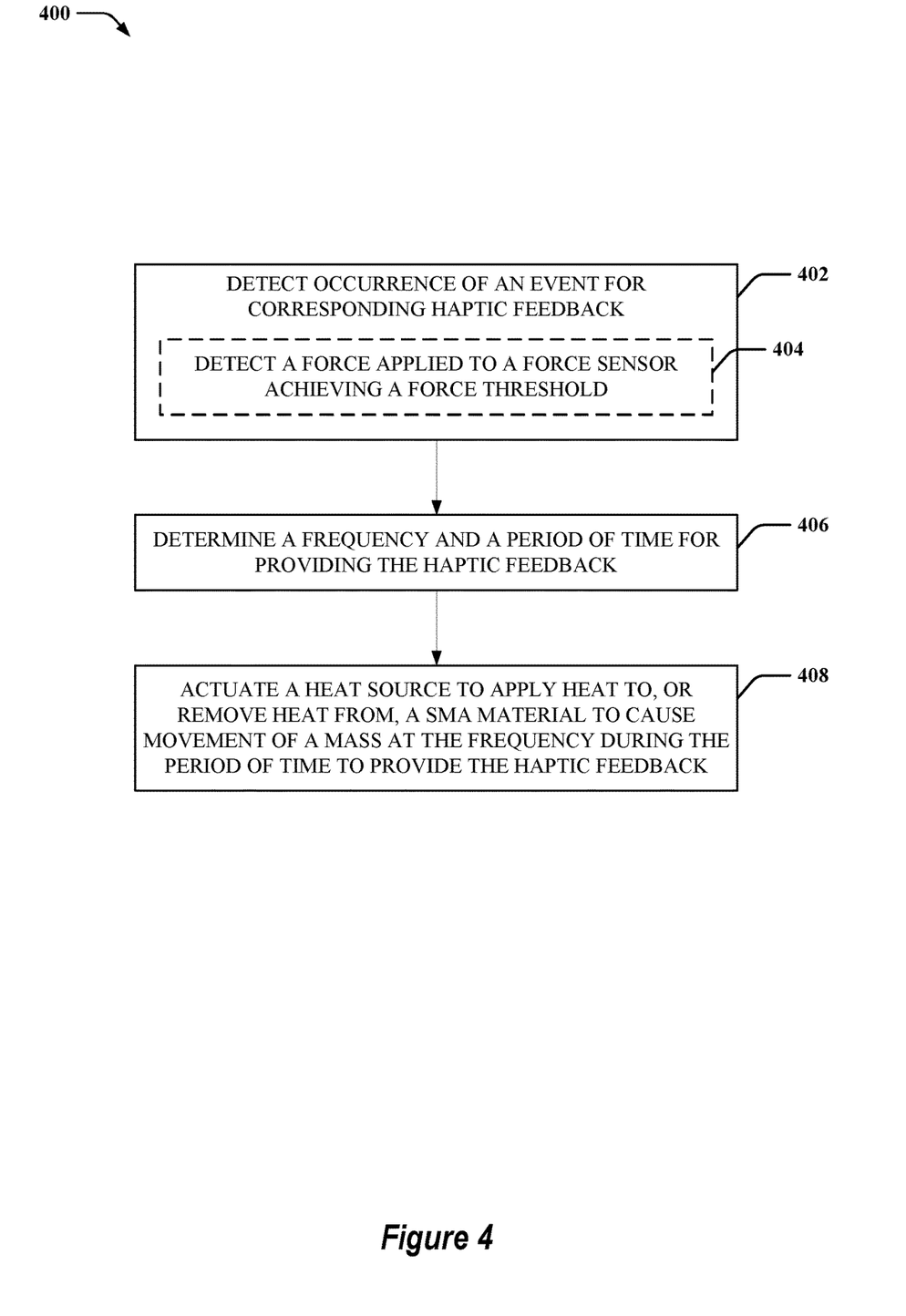
FIG. 4 illustrates a flow diagram of an example of a method for actuating haptic feedback mechanism in accordance with aspects described herein.

FIG. 4 is a flowchart of an example of a method 400 for operating a haptic feedback mechanism in accordance with aspects described herein. For example, method 400 can be performed by a haptic feedback mechanism 102, 200, 300, a device 100 employing a haptic feedback mechanism 102, 200, 300, and/or the like.

In method 400, at action 402, an occurrence of an event for corresponding haptic feedback can be detected. For example, device 100, haptic feedback mechanism 102, etc., e.g., in conjunction with processor 112, memory 114, electrical control function 116, etc., can detect the occurrence of the event for corresponding haptic feedback. For example, the event may correspond to activation of a key on a keyboard or trackpad, movement of a mouse or pen, activation of an area of a touch display, notification of an incoming call or message, an alarm, a timer, etc., feedback from a game, video, or other application, etc. Accordingly, in some examples, the notification may be received from an application (e.g., executed by processor 112 from instructions stored in memory 114), or may be received from a hardware device, such as a force sensor 118, etc.

Thus, in one example of method 400, optionally at action 404, a force applied to a force sensor achieving a force threshold can be detected. For example, device 100, haptic feedback mechanism 102, etc., e.g., in conjunction with processor 112, memory 114, electrical control function 116, etc., can detect the force applied to the force sensor 118 achieving the force threshold. For example, force sensor 118 may indicate a force to the device 100 or haptic feedback mechanism 102, which can measure the force to determine if the force achieves the force threshold. In another example, the force sensor 118 can provide indication of the force achieving the force threshold. For example, the threshold force can relate to a force specified for causing haptic feedback, as described. In any case, in this example, detection of the event can trigger providing of haptic feedback, as described herein.

In method 400, at action 406, a frequency and a period of time for providing the haptic feedback can be determined. For example, device 100, haptic feedback mechanism 102, etc., e.g., in conjunction with processor 112, memory 114, electrical control function 116, etc., can determine the frequency and period of time for providing the haptic feedback. In one example, this may be specific to the haptic feedback mechanism 102, and the haptic feedback mechanism 102 may be accordingly activated to provide the specific haptic feedback. In another example, this can be configurable on or for the haptic feedback device, such to allow specifying one or more parameters related to providing the haptic feedback. Thus, in an example, a device employing the haptic feedback mechanism may allow for specifying the one or more parameters (e.g., in a configuration) for certain types of events, where the one or more parameters may relate to the frequency (e.g., in Hz), the period of time, etc. for providing the haptic feedback. In addition, in some example, determining the frequency and/or period of time may be based on other parameters regarding the detected event. In one example, determining the frequency and/or period of time may be based on the force applied to a force sensor 118 (e.g., a frequency can be determined as a function of the amount of force applied, a period of time can be determined as a function of an amount of time the force is applied, etc.).

In method 400, at action 408, a heat source can be actuated to apply heat to, or remove heat from, a SMA material to cause movement of a mass at the frequency during the period of time to provide the haptic feedback. For example, device 100, haptic feedback mechanism 102, etc., e.g., in conjunction with processor 112, memory 114, electrical control function 116, etc., can actuate the heat source (e.g., actuator 104) to apply heat to, or remove heat from, the SMA material 106 to cause movement of the mass 108 at the frequency during the period of time to provide the haptic feedback. As described, applying heat to, and removing heat from, the SMA material 106 may cause movement of the mass 108 in a direction along an axis of movement 204, 304 and/or contacting the housing 202 of a haptic feedback mechanism 102, 200, 300 or related device to provide haptic feedback on the housing 202.

Haptic feedback mechanism(s) 102, 200, 300, may be employed in various devices and/or peripheral devices to provide haptic feedback for certain events. For example, haptic feedback mechanism(s) 102, 200, 300 can be employed in a keyboard, which may include force sensors 118 (e.g., force-sensitive resistor (FSR)) for each key on a keyboard. Accordingly, each force sensor 118 may be configured to detect a force applied to a given key, and one or more haptic feedback mechanism(s) 102, 200, 300 can provide haptic feedback, as described herein, based on detecting a force the achieves a force threshold. For example, the haptic feedback may include a single actuation of the haptic feedback mechanism or other low frequency vibration to simulate a key press or key retraction. For instance, in this example, the mass 108 of a given haptic feedback mechanism 102, 200, 300 may be configured to move a few millimeters (e.g., 1-2 mm) along the axis of movement 204, 304 when associated SMA material(s) 106 are actuated. In one example, the keys on the keyboard may have zero travel (e.g., may not move when pressed), but the haptic feedback may be felt through the keys. In one example, the keyboard can employ haptic feedback mechanisms 102, 200, 300 for each key, for regions of keys, etc., such that detection of force achieving a force threshold can cause the appropriate haptic feedback mechanism to provide haptic feedback (e.g., along a Z-axis, X-axis, and/or Y-axis, depending on the configuration of the haptic feedback mechanism). Moreover, for example, the keys may have thin plastic surfaces to allow for feeling the haptic feedback. In addition, in an example, the spring element 110 may couple the mass directly to the key of the keyboard (e.g., such that the key can be or can include the surface 206.

In another example, haptic feedback mechanism(s) 102, 200, 300 can be employed in a trackpad, which may include force sensors 118 configured to detect a force applied on the trackpad, and can accordingly apply the appropriate haptic feedback via one or more haptic feedback mechanisms 102, 200, 300. For example, the trackpad may detect a dragging action along the trackpad, a click or press on the trackpad, etc., and may provide different haptic feedback (e.g., via one or multiple haptic feedback mechanisms 102, 200, 300 and/or along one or more different axes). In yet another example, haptic feedback mechanism(s) 102, 200, 300 can be employed in a touch display, a related pen device, dial device, etc., which may include force sensors 118 for detecting a force applied to the touch display and/or using the pen or dial, and accordingly providing haptic feedback.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Several aspects of an actuated locking device have been described above with reference to various systems and methods. One or more portions of these systems and methods may have been described or illustrated in the accompanying drawings by various blocks, modules, components, circuits, steps, processes, algorithms, etc. (collectively referred to as "elements"). One or more of these elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for providing haptic feedback, comprising:
   a mass;
   a spring element coupled to the mass and coupled to a surface, wherein the spring element supports the mass and allows for movement of the mass with respect to the surface;
   a shape memory alloy (SMA) material coupled to the mass and coupled to the surface such that contraction of the SMA material pulls the mass from a first position to a second position causing application of an opposing force by one of compression or decompression of the spring element, and wherein loosening of the SMA material causes the applied opposing force to move the mass from the second position toward the first position by the other one of compression or decompression of the spring element; and
   a heat source configured to selectively apply heat to, and remove heat from, the SMA material to achieve a modulation of contracting and loosening of the SMA material to cause a vibration of the mass.

2. The apparatus of claim 1, wherein the contraction or loosening of the SMA material causes the mass to move along an axis substantially perpendicular to the surface.

3. The apparatus of claim 1, wherein the contraction or loosening of the SMA material causes the mass to contact another surface, wherein the surface and another surface are part of a housing of a haptic feedback device or a chassis of a computing device.

4. The apparatus of claim 1, wherein the mass comprises a coupling member to which the SMA material is fixedly attached.

5. The apparatus of claim 1, wherein the mass includes one or more walls defining a channel within which the SMA material is disposed.

6. The apparatus of claim 5, wherein the mass comprises multiple coupled portions, and wherein at least two of the multiple coupled portions define a portion of the channel.

7. The apparatus of claim 1, wherein the mass comprises a material and/or forms an extension structure that provides a heatsink for the SMA material.

8. The apparatus of claim 1, wherein the heat source comprises a printed circuit board (PCB) or a wire coupled to the PCB.

9. The apparatus of claim 1, wherein the SMA material is a SMA wire, a SMA plate, or a SMA foil.

10. The apparatus of claim 1, wherein the surface is part of a chassis of a computing device.

11. The apparatus of claim 1, wherein the surface is part of a key on a peripheral device.

12. The apparatus of claim 11, wherein the key further comprises a force sensor, and wherein the peripheral device is configured to activate, based at least in part on detecting a force applied to the key, the heat source to selectively apply the heat to and remove the heat from the SMA material.

13. The apparatus of claim 11, wherein the peripheral device includes at least one of a keyboard, a trackpad, or a pen.

14. The apparatus of claim 1, further comprising an actuator driving sensor configured to analyze one or more properties of the SMA material, and adjust one or more parameters of the heat source to adjust contracting or loosening of the SMA material.

15. A computing device, comprising:
   a chassis;
   a display disposed within the chassis;
   at least one processor and a memory disposed within the chassis;
   a haptic feedback mechanism, comprising:
      a mass;
      a spring element coupled to the mass, wherein the spring element supports the mass and allows for movement of the mass within the chassis;
      a shape memory alloy (SMA) material coupled to the mass such that contraction of the SMA material pulls the mass from a first position to a second position causing application of an opposing force by one of compression or decompression of the spring element, and wherein loosening of the SMA material causes the applied opposing force to move the mass from the second position toward the first position by the other one of compression or decompression of the spring element; and
      a heat source configured to selectively apply heat to, and remove heat from, the SMA material to achieve a modulation of contracting and loosening of the SMA material to cause a vibration of the mass.

16. The computing device of claim 15, further comprising a keyboard, wherein multiple keys of the keyboard each comprise the haptic feedback mechanism.

17. The computing device of claim 16, wherein the multiple keys each include a force sensor that, based on detecting a force applied, actuate the heat source to apply heat to and remove heat from the SMA material to achieve the modulation.

18. The computing device of claim 15, further comprising a trackpad that comprises the haptic feedback mechanism.

19. A method for providing haptic feedback, comprising:
   detecting, by a processor, occurrence of an event for corresponding haptic feedback;
   determining, by the processor, a frequency and a period of time for providing the haptic feedback; and
   actuating, by the processor, a heat source to apply heat to, or remove heat from, a shape memory alloy (SMA) material to cause movement of a mass, coupled with the SMA material, at the frequency during the period of time to provide the haptic feedback, wherein applying heat to the SMA material pulls the mass from a first position to a second position causing application of an opposing force by one of compression or decompression of a spring element, and wherein removing heat from the SMA material causes the applied opposing force to move the mass from the second position toward the first position by the other one of compression or decompression of the spring element.

20. The method of claim 19, wherein detecting the occurrence of the event comprises detecting a force applied to a force sensor achieves a force threshold.

* * * * *